US011438829B2

(12) United States Patent
Ly et al.

(10) Patent No.: US 11,438,829 B2
(45) Date of Patent: Sep. 6, 2022

(54) ADAPTIVE DISCOVERY CHANNEL MEASUREMENT TIME CONFIGURATIONS

(71) Applicant: QUALCOMM Incorporated, San Diego, CA (US)

(72) Inventors: Hung Dinh Ly, San Diego, CA (US); Seyedkianoush Hosseini, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 17/124,354

(22) Filed: Dec. 16, 2020

(65) Prior Publication Data

US 2022/0191774 A1    Jun. 16, 2022

(51) Int. Cl.
*H04L 12/26* (2006.01)
*H04W 48/16* (2009.01)
*H04W 72/04* (2009.01)

(52) U.S. Cl.
CPC ....... *H04W 48/16* (2013.01); *H04W 72/0406* (2013.01)

(58) Field of Classification Search
USPC ....... 370/241, 252, 278, 282, 310, 311, 332, 370/395.2, 395.4, 468
See application file for complete search history.

(56) References Cited

U.S. PATENT DOCUMENTS

| 9,532,204 | B2 | 12/2016 | Nguyen et al. |
| 2015/0043448 | A1 | 2/2015 | Chatterjee et al. |
| 2017/0201898 | A1* | 7/2017 | Park .................. H04W 16/32 |
| 2018/0019790 | A1* | 1/2018 | Mondal ............... H04B 7/0417 |
| 2018/0139030 | A1* | 5/2018 | Kim ..................... H04L 5/0053 |
| 2018/0160325 | A1* | 6/2018 | Cheng ................. H04B 17/336 |

OTHER PUBLICATIONS

CMCC: "Discussion on LAA DRS Design", 3GPP TSG-RAN WG2 Meeting #91, 3GPP Draft, R2-153209 LAA DRS Design, 3rd Generation Partnership Project (3GPP), Mobile Competence Centre, 650, Route Des Lucioles, F-06921 Sophia-Antipolis Cedex, France, vol. RAN WG2, No. Beijing, China, Aug. 24, 2015-Aug. 28, 2015, 4 Pages, Aug. 23, 2015 (Aug. 23, 2015), XP051040210, Retrieved from the Internet: URL: http://www.3gpp.org/ftp/Meetings_3GPP_SYNC/RAN2/Docs/ [retrieved on Aug. 23, 2015] the whole document.
International Search Report and Written Opinion—PCT/US2021/057423—ISA/EPO—dated Feb. 25, 2022.

* cited by examiner

*Primary Examiner* — Nguyen H Ngo
(74) *Attorney, Agent, or Firm* — Procopio, Cory, Hargreaves & Savitch LLP

(57) ABSTRACT

The apparatus is configured to receive, from a second UE, a set of DMTCs, receive information indicating a DMTC of the set of DMTCs to be used for measuring discovery signals, and measure discovery signals received from the second UE based on the indicated DMTC. The apparatus may be configured to receive additional information regarding at least one of a carrier, a BWP, or a resource pool through which the discovery signals will be transmitted and a numerology used by the discovery signals and communicate through at least one of a PSSCH or PSCCH with the second UE through a first carrier, BWP, resource pool, or numerology and wherein the channel measurements performed on the discovery signals received from the second UE based on the indicated DMTC are performed on a second carrier, BWP, resource pool, or numerology.

30 Claims, 11 Drawing Sheets

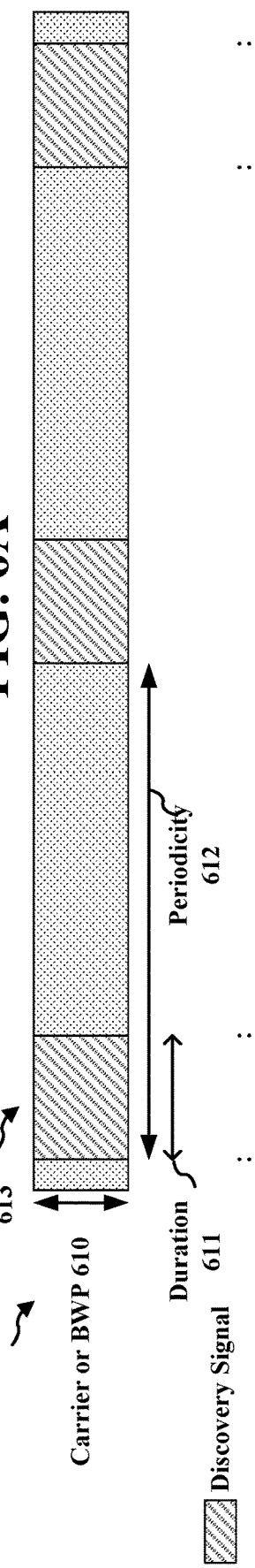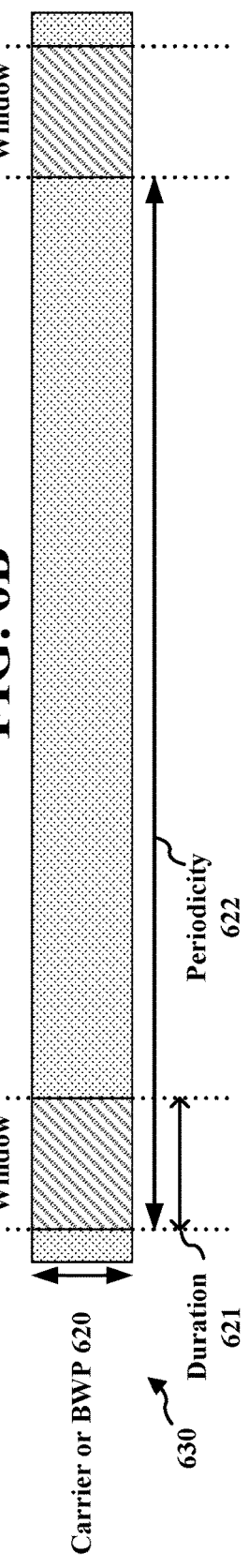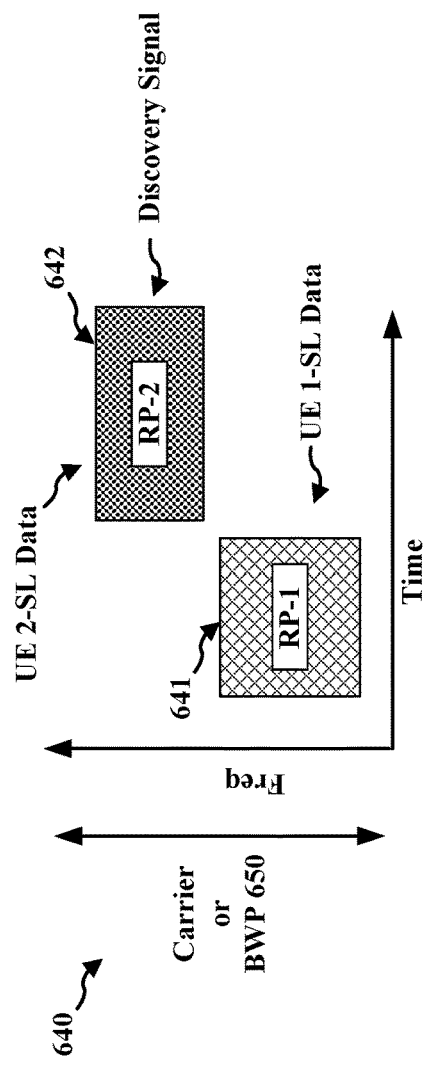

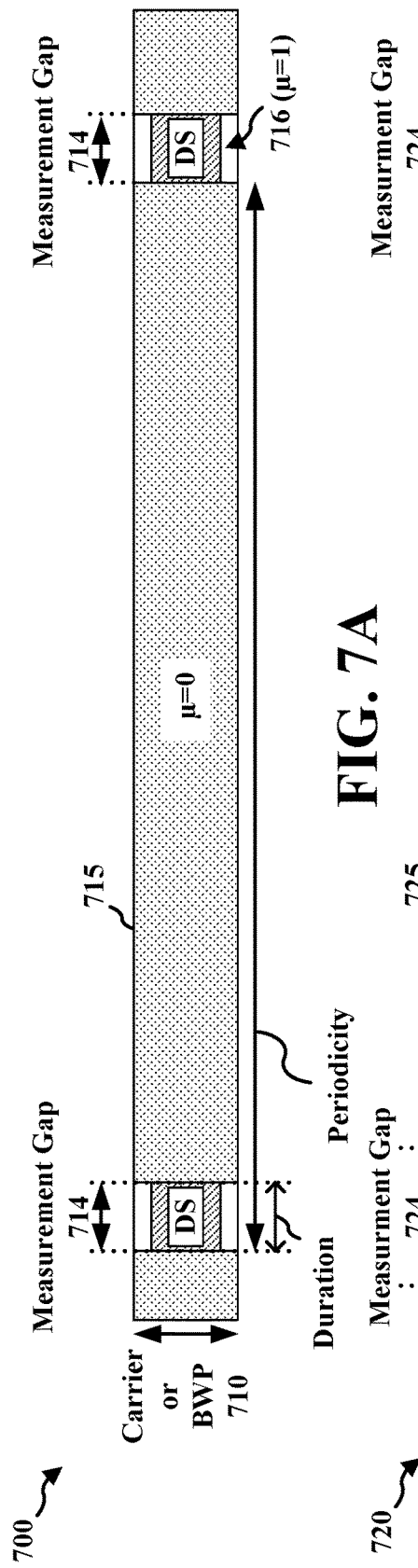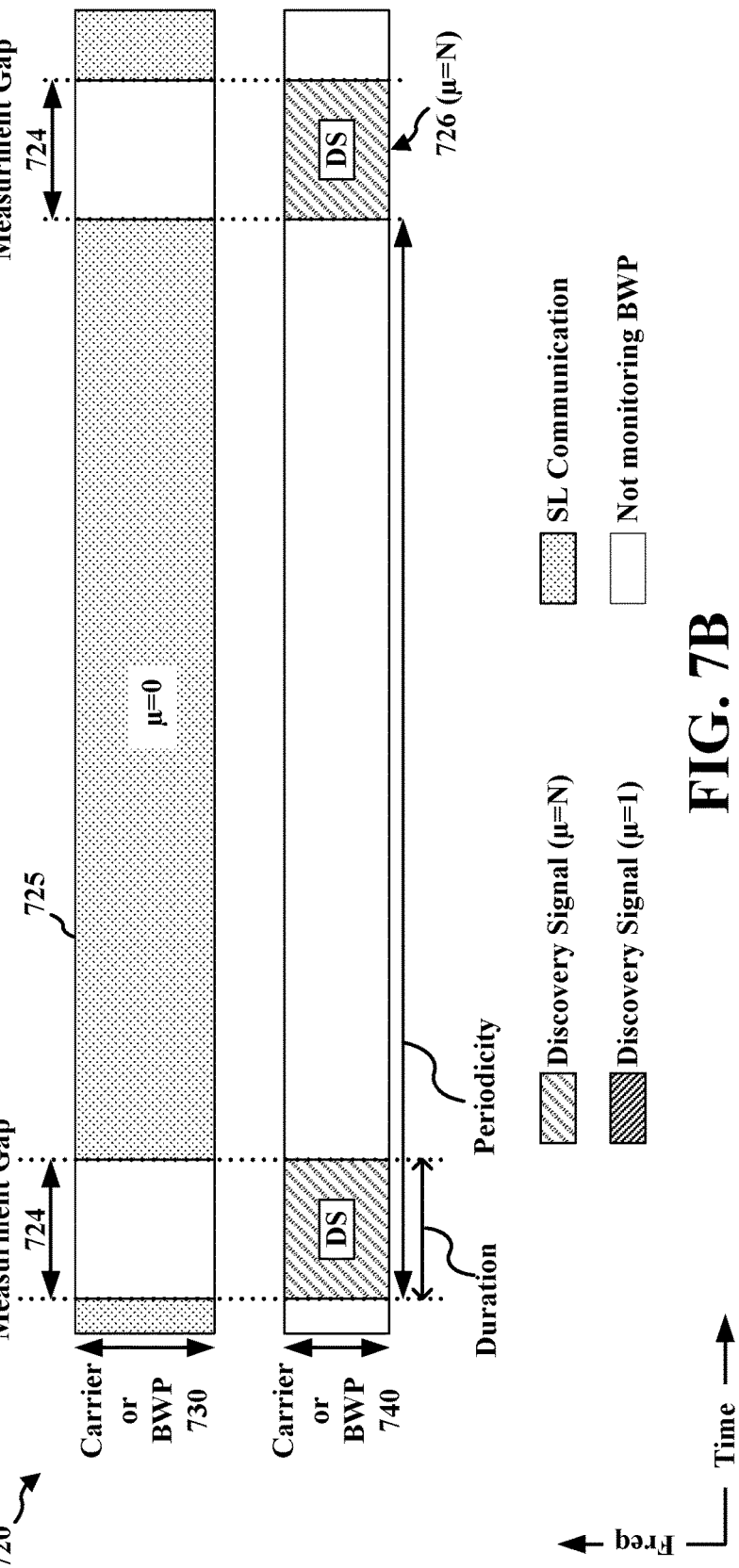
FIG. 7A
FIG. 7B

ADAPTIVE DISCOVERY CHANNEL MEASUREMENT TIME CONFIGURATIONS

BACKGROUND

Technical Field

The present disclosure relates generally to communication systems, and more particularly, to dynamically configurable discovery signal measurement configurations exchanged between user equipments (UEs) or between a UE and abase station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For UEs communicating through a sidelink (SL) channel, discovery signals can be measured (e.g., in terms of reference signal received power (RSRP), reference signal received quality (RSRQ), etc.) to identify candidate UEs for SL communication. From among a set of identified candidate UEs, a particular UE can be selected based on the measured discovery signals. For example, a UE transmitting a particular set of discovery signals measured to be the best (e.g., to have a highest or lowest value, depending on what is being measured) may be selected for SL communication. In order to efficiently use SL bandwidth, it may be useful to not measure unnecessary discovery signals given a set of current conditions.

In an aspect of the disclosure, a method, a computer-readable medium, and an apparatus are provided. The apparatus may be a first device at a first UE. The first device may be a processor and/or modem at a user equipment (UE) or the UE itself. The first device may be configured to receive a set of discovery channel measurement time configurations (DMTCs) from a second device (e.g., at a second UE). The first device may further be configured to receive information indicating a DMTC of the set of DMTCs to be used for measuring discovery signals. The first device may be configured to measure discovery signals received from the second UE based on the indicated DMTC.

The DMTC may specify a duration and a periodicity of discovery signals. In some aspects, a set of DMTCs may be received in configuration information (e.g., radio resource control (RRC) information from a base station) such that a given DMTC to be used for measuring discovery signals can be identified by identifying a pre-configured DMTC in the received configuration information (e.g., in a received table of pre-configured DMTCs). A particular pre-configured DMTC may be designated as a default DMTC in some configurations. In some aspects, additional configuration information may be received by the first device. The additional configuration information may include a carrier through which the discovery signals will be measured, a bandwidth part (BWP) through which the discovery signals will be measured, a resource pool through which the discovery signals will be measured, and a numerology used to measure the discovery signals. The carrier, BWP, resource pool, or numerology of the discovery signals to be measured may be the same as, or different from, the carrier, BWP (e.g., the active BWP), resource pool, or numerology through which the first device communicates with the second device.

The first device may further be configured to transmit a recommendation to the second device to switch from a current DMTC to a different DMTC. The transmission of the recommendation, in some aspects, may be based on a determination that mobility conditions associated with the first device are greater than a first UE mobility threshold or less than a second UE mobility threshold. The recommendation may be UE mobility conditions associated with the first device and/or a DMTC identifier identifying a DMTC in the set of received DMTCs.

In another aspect of the disclosure, a method, a computer-readable medium, and an apparatus are provided. The apparatus may be a second device at a second UE. The second device may be a processor and/or modem at a user equipment (UE) or the UE itself. The second device may be configured to transmit a set of discovery channel measurement time configurations (DMTCs) to the first device. The second device may further be configured to transmit information indicating a DMTC of the set of DMTCs to be used by the first UE for measuring discovery signals. The second device may be configured to transmit discovery signals to the first UE for the first UE to measure based on the indicated DMTC.

In some aspects, the second device may also receive a set of DMTCs in configuration information (e.g., RRC information from a base station) such that a given DMTC to be used for measuring discovery signals at the first UE can be identified by identifying a pre-configured DMTC in the received configuration information (e.g., in a received table of pre-configured DMTCs). In some aspects, the second device may be configured to transmit the set of DMTCs to the first device after receiving it from a base station. A particular pre-configured DMTC may be designated as a default DMTC in some configurations. In some aspects, additional configuration information may be transmitted to the first device. The additional configuration information may include a carrier through which the discovery signals will be measured, a BWP through which the discovery signals will be measured, a resource pool through which the discovery signals will be measured, and a numerology used to measure the discovery signals. The carrier, BWP, resource pool, or numerology of the discovery signals to be measured may be the same as, or different from, the carrier, BWP, resource pool, or numerology through which the first device communicates with the second device.

The second device may further be configured to receive a recommendation from the first device to switch from a current DMTC to a different DMTC. The transmission of the information indicating the DMTC of the set of DMTCs to be used for measuring discovery signals at the first UE may be transmitted in response to the received DMTC recommendation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6A is a diagram illustrating an example of a first DMTC.

FIG. 6B is a diagram illustrating an example of a second DMTC.

FIG. 6C is a diagram illustrating sets of resource pools through which different UEs are assigned for communicating and through one of which discovery signals are transmitted.

FIG. 7A is a diagram illustrating an example of a measurement gap based on a change in numerology between SL communication and discovery signals.

FIG. 7B is a diagram illustrating an example of a measurement gap based on a change in carrier or BWP between SL communication and discovery signals.

DETAILED DESCRIPTION

Figure 1:
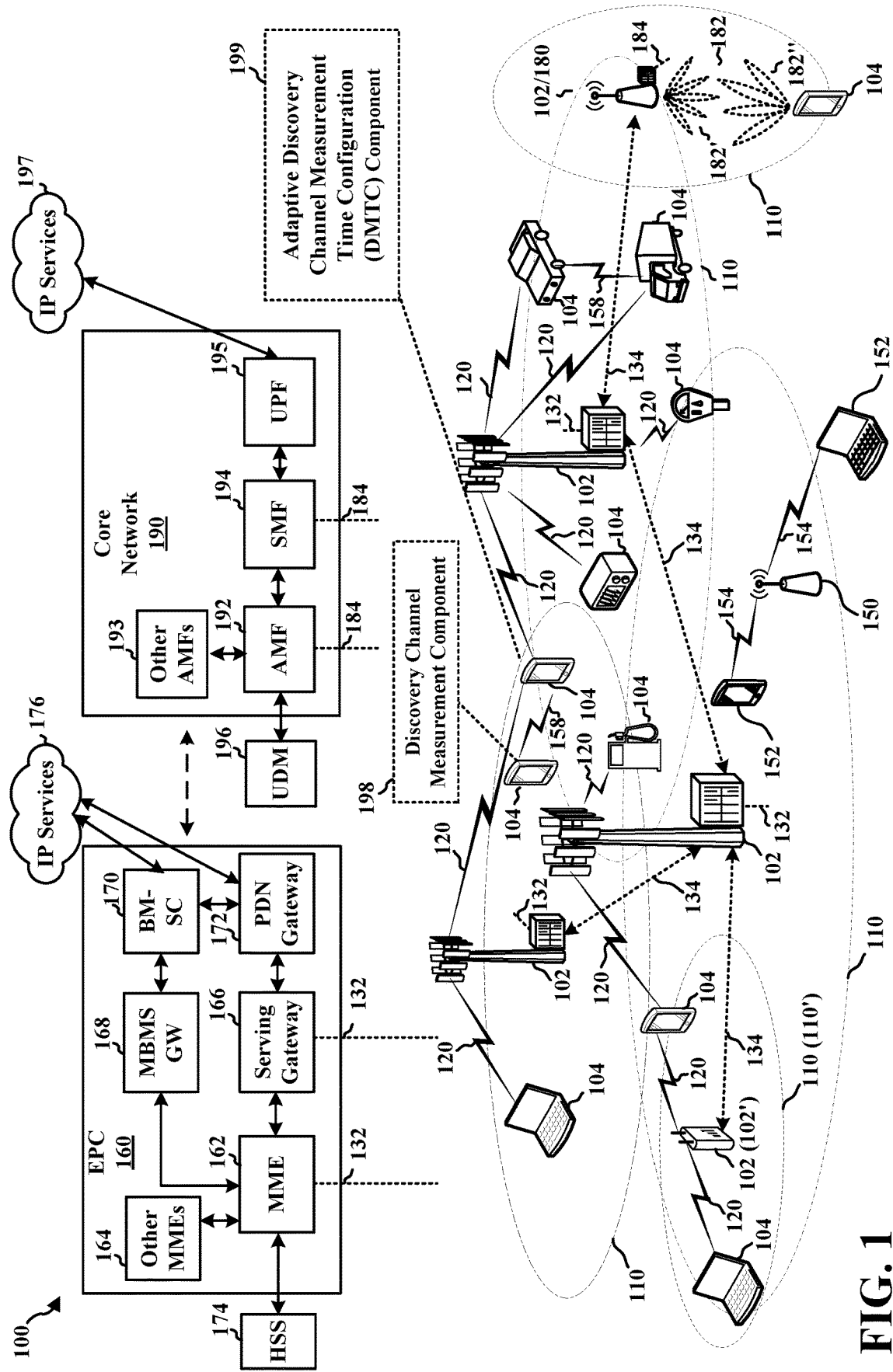
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (IMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station.

Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a discovery channel measurement component 198 that is configured to receive, from a second UE, a set of discovery channel measurement time configurations (DMTCs); receive information indicating a DMTC of the set of DMTCs to be used for measuring discovery signals; and measure discovery signals received from the second UE based on the indicated DMTC configuration. Referring again to FIG. 1, in certain aspects, the UE 104 may include an adaptive discovery channel measurement component 199 that is configured to transmit, to a first UE, a set of discovery channel measurement time configurations (DMTCs); transmit, to the first UE, information indicating a DMTC of the set of DMTCs to be used by the first UE for measuring discovery signals; and transmit discovery signals to the first UE for the first UE to measure based on the indicated DMTC. One of ordinary skill in the art will appreciate that discovery signals may be transmitted by a UE (e.g., a UE 104 including adaptive discovery channel measurement component 199) in addition to those transmitted during a time indicated by information indicating a DMTC to a different UE (e.g., a UE 104 including discovery channel measurement component 198).

Figure 2:
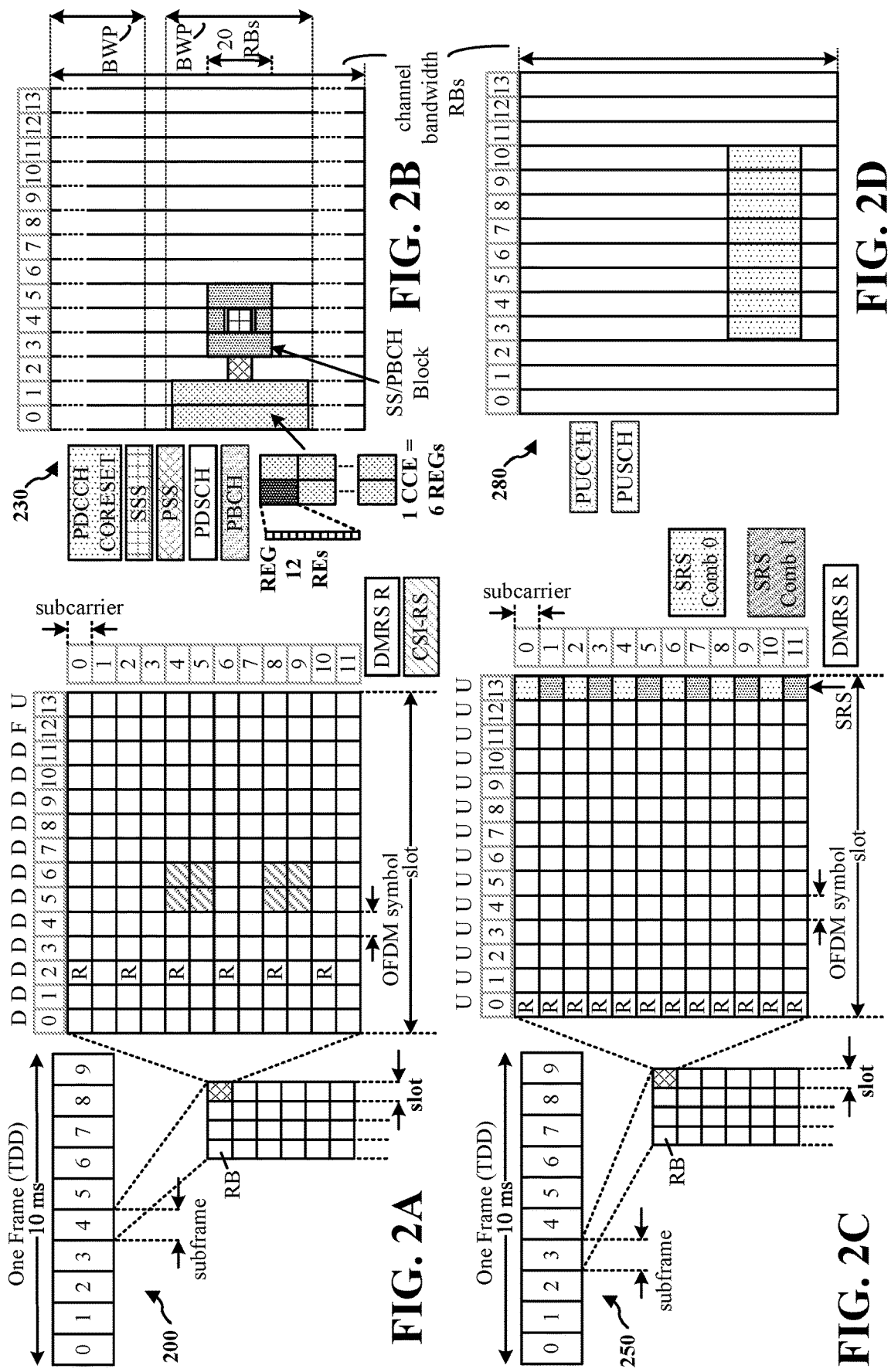
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 29 slots/subframe. The subcarrier spacing and symbol length/duration are a function of the numerology. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
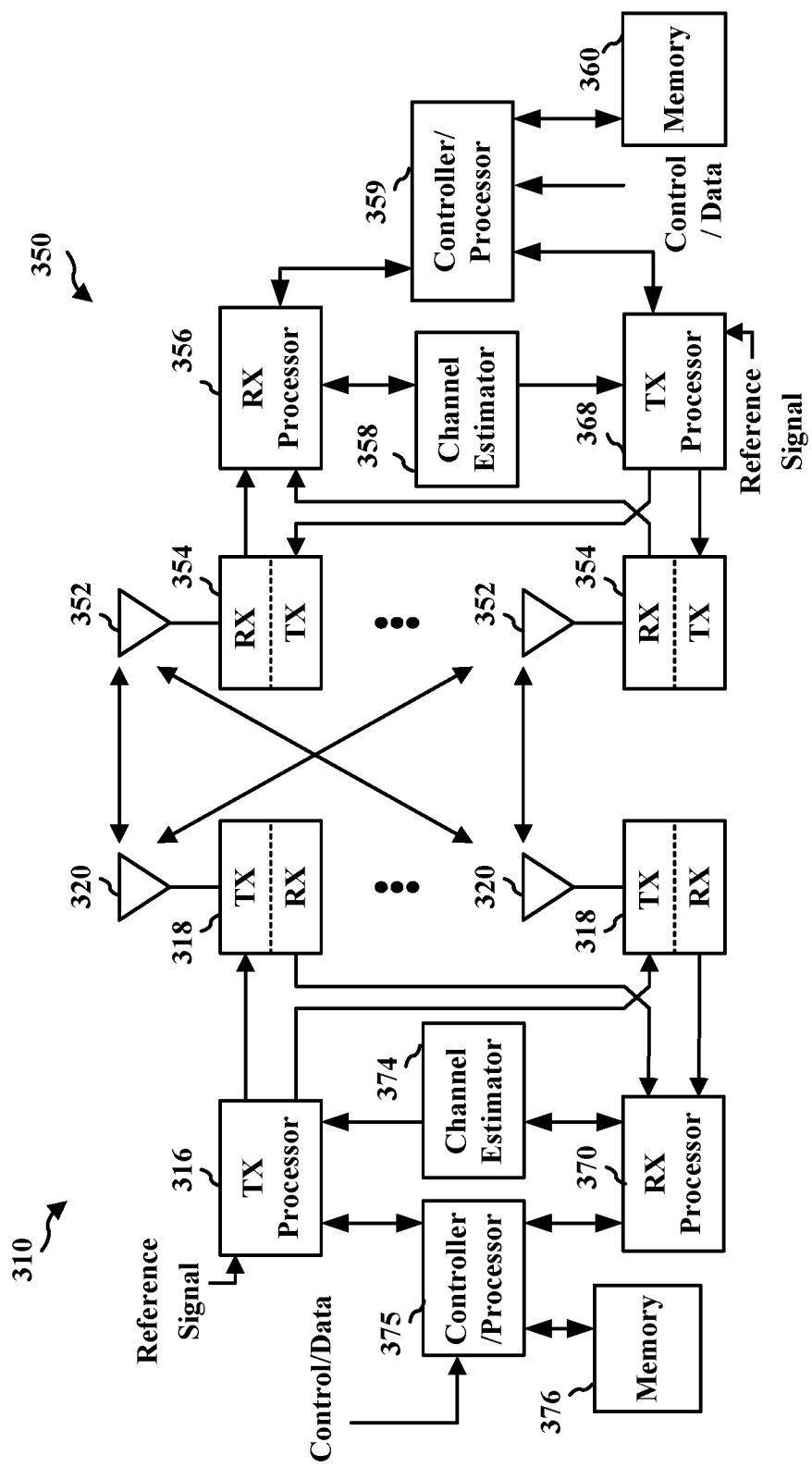
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 368, the RX processor 356, and the controller/processor 359 may be configured to perform aspects in connection with 199 of FIG. 1.

In 5G NR, UEs can communicate directly. In order to facilitate direct communication, UEs may transmit and receive discovery signals. The periodicity and the duration of the discovery signals (also referred to as discovery reference signals) may be defined in a discovery reference signal (DRS) (or discovery channel) measurement time configuration (DMTC). Under different conditions (e.g., different UE mobility conditions), different periodicity and duration may be sufficient for discovery signal measurement. Accordingly, there is benefit to introducing adaptive DMTC to reduce power usage for a UE measuring, or transmitting, discovery signals, and to use communication resources more efficiently.

Figure 4:
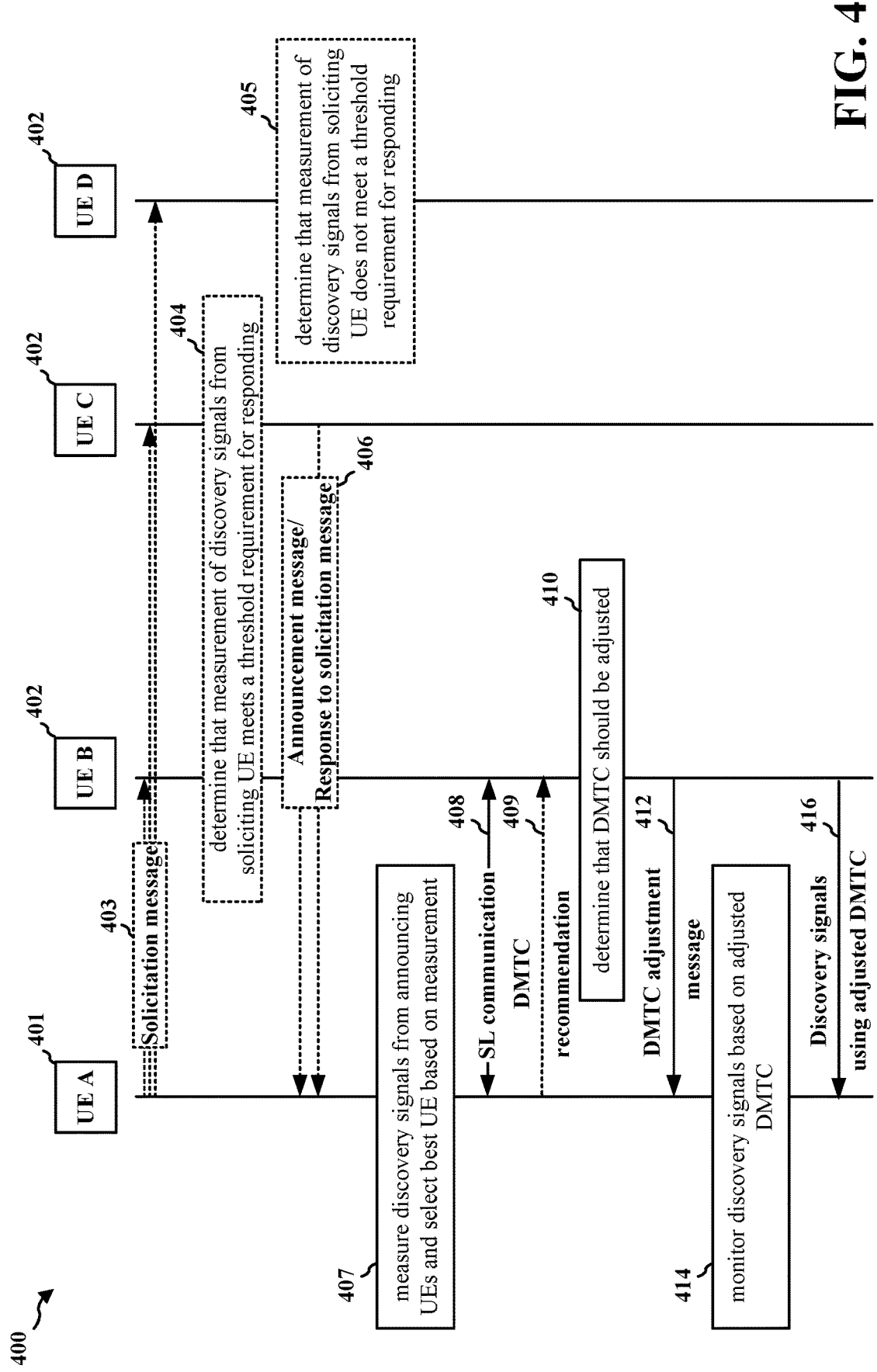
FIG. 4 is a call flow diagram illustrating the use of adaptive DMTCs.

FIG. 4 is a call flow diagram 400 illustrating the use of adaptive DMTCs. As illustrated in FIG. 4, a first UE 401 (i.e., UE A), in some configurations, may transmit a solicitation signal 403 to a set of other UEs 402 (i.e., UEs B-D) to establish a connection with the other UEs 402 to communicate through the UE 402 (e.g., as a relay) to a base station (e.g., an eNB or gNB). The receiving UEs 402 may measure the discovery signals (e.g., measure a reference signal received power (RSRP), reference signal received quality (RSRQ), etc. of the discovery signals). The receiving UEs may determine that the measurement meets a threshold for responding at 404 or that the measurement does not meet a threshold for responding at 405. The UEs 402 for which the measurement meets the threshold, at 404, then respond 406 to UE 401. Alternatively, in some embodiments, each UE 402 that is available to serve as a relay to a base station may periodically transmit an announcement message 406. UE 401 may measure, at 407, the discovery signals received from the other UEs 402 (e.g., UEs B and C) and may select a UE based on the measurement and a set of criteria. Once a UE 402 (e.g., UE B) is selected, a sidelink communication session can be established and SL communication 408 may be exchanged with UE B 402 (e.g., a second UE). For example, SL communication between UE A 401 and UE B402 may be through a PC5 interface.

In some configurations, a UE 401 may transmit a DMTC recommendation 409 to the connected UE 402 to adjust a DMTC (e.g., to switch from a first DMTC to a second DMTC). In some configurations, the recommendation may specify a particular DMTC from a set of pre-configured DMTCs. In other configurations, the UE 401 may transmit a set of characteristics of the UE 401 on which the connected UE 402 can base a decision to adjust a DMTC. The recommendation, in some configurations, may be based on the UE 401 determining that some characteristic of the UE 401 has changed (e.g., a measure of the UE's mobility has crossed a threshold value). For example, a UE 401 may transmit information regarding a mobility of the UE (e.g., that the mobility is between a set of threshold values, that the mobility exceeds (or is below) a particular threshold value, etc.) on which a connected UE 402 may base a decision to adjust a periodicity or duration of discovery signals. A periodicity may be adjusted to maintain the quality of the connection by increasing the frequency of discovery signals or to conserver power by limiting the amount of time the UE 401 may need to monitor discovery signals by decreasing the frequency of discovery signals. DMTC recommendation 409 may be transmitted by UE A 401 and received by UE B 402 through a PC5 interface.

Based on the recommendation, or on other criteria in the absence of a recommendation 409, the connected UE 402 may determine that the DMTC should be adjusted at 410. The connected UE 402 may transmit a DMTC adjustment message 412 that is received by UE 401. The DMTC adjustment message 412 may identify a pre-configured DMTC or provide a set of configuration information including information regarding periodicity, duration, timing (e.g., frame, subframe, slot, symbol, etc.), carrier, BWP, or specific resources used for the discovery signals. The DMTC adjustment message may be transmitted by UE 402 and received by UE 401 through sidelink control information (SCI) (e.g., SCI-2) or through a media access control (MAC) control element (CE) (MAC-CE) through a PC5 interface (e.g., an interface for D2D communication) or physical sidelink feedback channel (PSFCH).

The UE 401 may begin to monitor for discovery signals, at 414, using the information provided in the received DMTC adjustment message. After transmitting the DMTC adjustment message 412, the UE 402 may transmit discovery signals using the adjusted DMTC 416. One of ordinary skill in the art will appreciate that communications 408 may continue to be exchanged throughout and that communications and operations 409-416 may be performed multiple times as conditions change for either UE 401 or 402.

Figure 5:
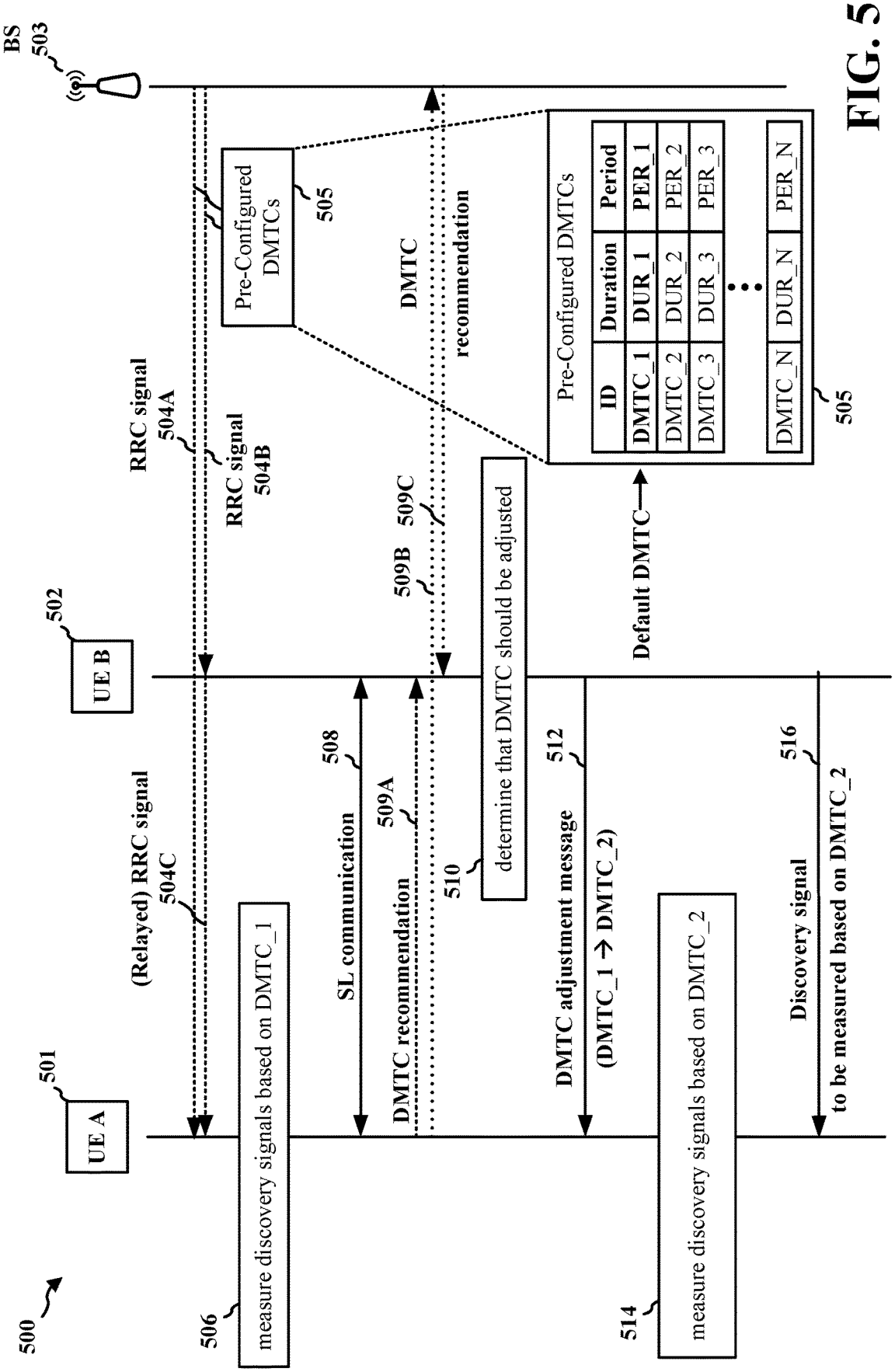
FIG. 5 is a call flow diagram illustrating the use of pre-configured DMTCs.

FIG. 5 is a call flow diagram 500 illustrating the use of pre-configured DMTCs 505. Base station 503 may transmit RRC signals 504A and 504B to a first UE 501 and a second UE 502. RRC signals 504A-C may include a set of pre-configured DMTCs 505 that may define a set of DMTCs by specifying a DMTC identifier (ID) that is associated with a duration and periodicity of the discovery signals. In addition to the duration and the periodicity of the discovery signals, some configurations may associate information with a DMTC ID that includes a carrier, a BWP, a resource pool, a measurement gap, and/or numerology associated with the DMTC as described in relation to FIGS. 6A-7B below. In some configurations, UE 501 may not receive RRC signal 504A (because it is not connected to base station 503) and instead may receive RRC signal 504C from the second UE 502. UE 502 may be transmitting the RRC signal 504C independently or acting as a relay from base station 503. In some configurations, instead of RRC signals, the set of DMTCs may be transmitted through system information.

At 506, the first UE 501 may use DMTC_1 for receiving and measuring discovery signals. In some configurations, the use of DMTC_1 may be based on a designation of DMTC_1 as a default DMTC. A sidelink communication session having been established and a DMTC selected, SL communication 508 may be exchanged with the second UE 502 through a PC5 interface.

In some configurations, the first UE 501 may transmit a DMTC recommendation 509A to the connected second UE 502 to adjust a DMTC. The DMTC recommendation 509A may be transmitted to the connected second UE 502 through a PC5 interface. Alternatively, the DMTC recommendation may be transmitted as DMTC recommendation 509B to base station 503 which may in turn communicate the recommendation to the second UE 502 as DMTC recommendation 509C. DMTC recommendations 509B and 509C may be transmitted through Uu interfaces (e.g. interfaces for UE to BS communication) between the UEs 501 and 502 and base station 503. The recommendation may specify a particular DMTC from the set of pre-configured DMTCs 505. The recommendation, in some configurations, may be based on the first UE 501 determining that some characteristic of the first UE 501 has changed (e.g., a measure of the UE's mobility has crossed a threshold value). For example, the first UE 501 may transmit the DMTC recommendation 509A or 509B based on detecting that the mobility of the first UE 501 is now between a set of threshold values that it was not between before, or that the mobility exceeds (or is below) a particular threshold value.

Based on the recommendation, or on other criteria in the absence of a recommendation 509A and/or 509B and 509C, the connected second UE 502 may determine that the DMTC should be adjusted at 510. The connected UE 502 may transmit a DMTC adjustment message 512 that is received by the first UE 501. The DMTC adjustment message 512 may identify a pre-configured DMTC and a set of configuration information including information regarding timing (e.g., frame/subframe/slot/symbol), carrier, BWP, or specific resources used for the discovery signals. The DMTC adjustment message may be transmitted by UE 502 and received by UE 501 through SCI or through a MAC-CE through a PC5 interface. The UE 501 may begin to monitor for discovery signals, at 514, using the information provided in the received DMTC adjustment message. After transmitting the DMTC adjustment message 512, the second UE 502 may transmit discovery signals 516 to be measured based on the adjusted DMTC (e.g., DMTC_2). One of ordinary skill in the art will appreciate that communications 508 may continue to be exchanged throughout and that communications and operations 509-516 may be performed multiple times as conditions change for either UE 501 or 502.

FIG. 6A is a diagram 600 illustrating an example of a first DMTC. FIG. 6B is a diagram 630 illustrating an example of a second DMTC. FIG. 6C is a diagram 640 illustrating sets of resource pools through which different UEs are assigned for communicating and through one of which discovery signals are transmitted. FIG. 6A illustrates a first DMTC that may specify a duration 611 and a periodicity 612 for discovery signals 613 in a carrier or BWP 610 (e.g., an active carrier or BWP used for SL communication). As shown, the discovery signals 613 may occupy the whole carrier or BWP 610. However, in some configurations, the discovery signals 613 may occupy a portion of the carrier or BWP 610. FIG. 6B illustrates a second DMTC in a second carrier or BWP 620 that may specify a same duration 621 as duration 611, but also may specify a different periodicity 622 than periodicity 612. In some configurations, the periodicity and the duration can vary independently and different configurations may specify either the same periodicity or the same duration with corresponding different durations and periodicities, respectively.

FIG. 6C illustrates a first resource pool (RP-1) 641 through which a first UE may transmit and receive sidelink (SL) data and a second resource pool (RP-2) 642 through which a second UE may transmit and receive SL data and through which discovery signals can be transmitted and received. As shown, RP 641 and RP 642 may include first and second distinct sets of resources, respectively, in a carrier or BWP 650 in a time-and-frequency resource space. In some configurations, RP 641 and RP 642 may overlap (partially or completely) in time and/or frequency (i.e., may include resources that overlap in at least one of time or frequency). RP 641 and RP 642 may include different amounts or assigned resources. One of ordinary skill in the art will appreciate that either or both of the RPs assigned to SL communication and the discovery signals can span all or a portion of the frequencies of carrier or BWP 650 and that, in some configurations, the frequencies may be in a same carrier or BWP but the span of frequencies for the SL communication and the discovery signals may not have any common frequencies.

FIG. 7A is a diagram 700 illustrating an example of a measurement gap 714 based on a change in numerology between SL communication 715 and discovery signals 716. FIG. 7B is a diagram 720 illustrating an example of a measurement gap 724 based on a change in carrier or BWP between SL communication 725 and discovery signals 726.

FIG. 7A illustrates a carrier or BWP 710 that includes a set of frequency resources that are used by the discovery signals and a set of frequency resources that are used by the UE for SL communication. As shown, SL communication 715 may span all the frequencies of the carrier or BWP 710, while the discovery signals 716 may span a subset of the frequencies of the carrier or BWP 710. In FIG. 7A, SL communications 715 may use a first numerology $\mu=0$ and discovery signals 716 may use a second numerology $\mu=1$ (where a numerology determines a subcarrier spacing and slot/symbol duration for the transmission and reception of signals). A UE that is transmitting and receiving signals and/or data using a first numerology ($\mu=0$) may receive a discovery signal using a second numerology ($\mu=1$). During the time that the UE receives discovery signals 716 (e.g., during measurement gaps 714) the UE may not be available to receive SL data communication 715 (e.g., data communication that is not discovery signals). For example, different processing may be used for the SL communications 715 received using a first numerology ($\mu=0$) and for the discovery signals 716 using a second, different numerology ($\mu=1$). Accordingly, the UE may refrain from transmitting or receiving data communication when performing the channel measurements on the discovery signals received from the second UE during the measurement gap 714.

Similarly, FIG. 7B illustrates a first carrier or BWP 730 through which SL communications are transmitted and/or received and a second carrier or BWP 740 through which discovery signals are transmitted and/or received. A UE that is transmitting and receiving signals and/or data through the first carrier or BWP 730 may receive a discovery signal through the second carrier or BWP 740. During the time that the UE receives the discovery signal 726 through the second carrier or BWP 740 the UE may not be available to receive SL data communication 725 (e.g., data communication that is not discovery signals). Accordingly, the UE may refrain from transmitting or receiving data communication 725 when performing the channel measurements on the discovery signals received from the second UE during the measurement gap 724.

Figure 8:
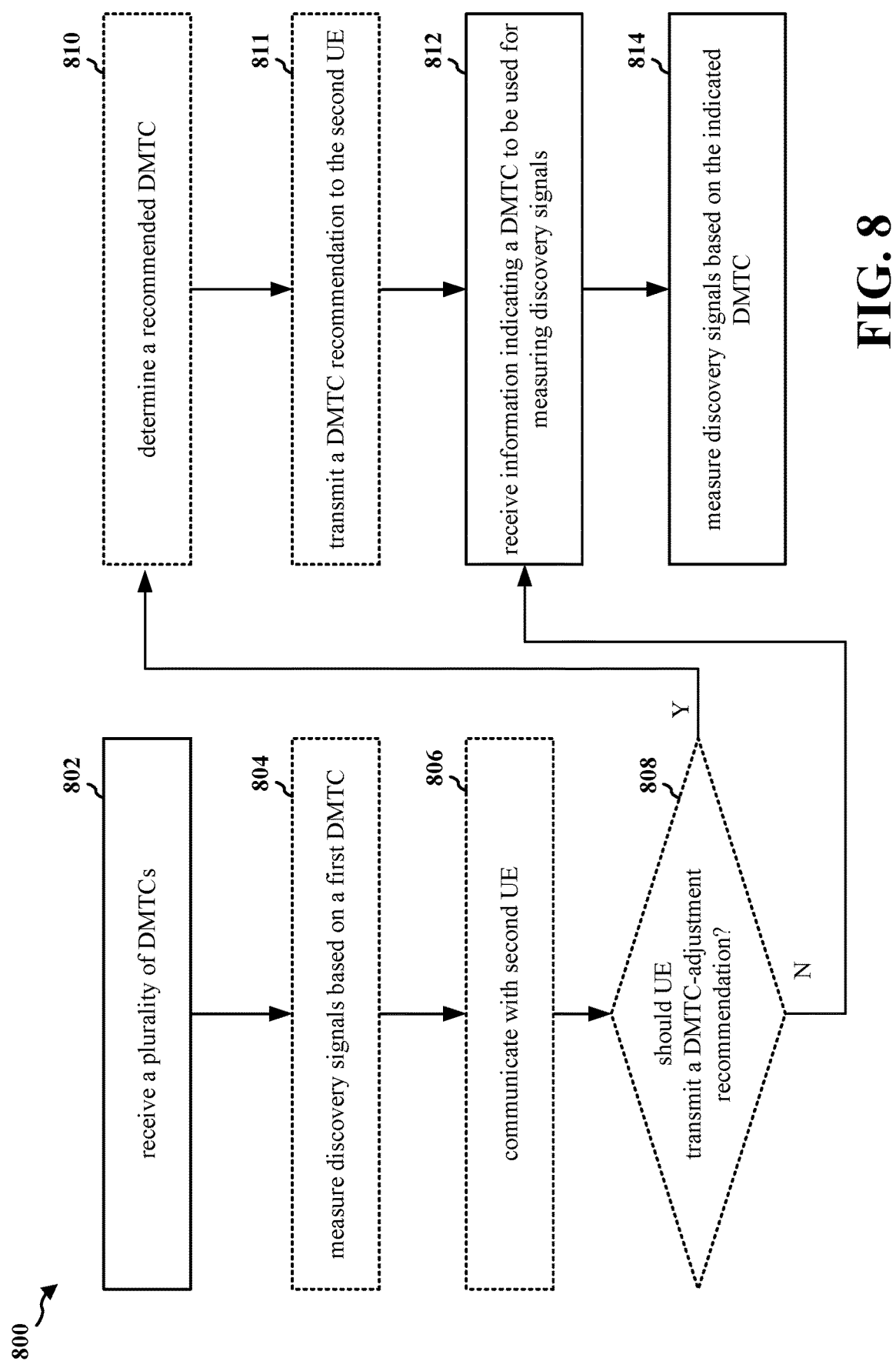
FIG. 8 is a flowchart of a method of wireless communication.

FIG. 8 is a flowchart 800 of a method of wireless communication. The method may be performed by a device at a UE (e.g., UE 401/501). The device may be a processor/modem within the UE 401/501 or the UE 401/501 itself. The device is herein referred to as a first UE. Optional aspects are illustrated with a dashed line. In one configuration, the first UE may receive, at 802, a set of one or more DMTCs. For example, 802 may be performed by 1040 in FIG. 10. The set of DMTCs, in some configurations, is a set of pre-configured DMTCs (e.g., pre-configured DMTCs 505) as shown in FIG. 5 that define a set of DMTCs by specifying a DMTC ID that is associated with a duration and periodicity of the discovery signals. In addition to the duration and periodicity of the discovery signals, some configurations may associate information with a DMTC ID that includes a carrier, a BWP, a resource pool, a measurement gap, and/or numerology associated with the DMTC as described in relation to FIGS. 6A-7B. The set of DMTCs may be received from a second UE (e.g., UE 502) or a base station (e.g., base station 503). The DMTCs may be received through RRC signaling (e.g., RRC signal 504A and/or 504C) or system information.

The first UE, at 804, may measure discovery signals received from the second UE based on a first DMTC, in some configurations. For example, 804 may be performed by 1040 in FIG. 10. The first DMTC, in some configurations, is a particular configuration in the set of DMTCs (e.g., set of DMTCs 505) that is a default configuration. For example, UE 501 of FIG. 5 uses default DMTC "DMTC_1" until a DMTC adjustment message 512 that indicates a different DMTC (e.g., DMTC_2) is received.

In one configuration, the first UE and second UE may communicate, at 806, through at least one of a physical sidelink shared channel (PSSCH) or physical sidelink control channel (PSCCH) through a first carrier (e.g., 610, 710, 730), BWP (e.g., 610, 710, 730), and/or resource pool (e.g., 641 or 642) and using a first numerology (e.g., 0, 1, N) as illustrated by, and discussed in relation to, FIGS. 6A-7B. For example, 806 may be performed by 1040 in FIG. 10. The discovery signals are transmitted through a second carrier (e.g., 610, 710, 740), BWP (e.g., 610, 710, 740), and/or resource pool (e.g., 641 or 642) and using a second numerology (e.g., 0, 1, N) as in FIGS. 7A and 7B. The second carrier, BWP, resource pool and/or numerology can be the same as, or different from, the first carrier, BWP, resource pool and/or numerology as illustrated by, and discussed in relation to, FIGS. 6A-7B.

In one configuration, the first UE may determine, at 808, whether the UE should transmit a DMTC-adjustment recommendation to the second UE. For example, 808 may be performed by 1040 in FIG. 10. The determination, at 808, may be based on detecting that a mobility of the first UE has crossed a threshold mobility (e.g., one of a set of thresholds). Alternatively, or additionally, the determination, at 808, may be based on a mobility value of the first UE being greater than a first UE mobility threshold (e.g., a value indicating that the UE is moving quickly) or less than a second UE mobility threshold (e.g., a value indicating that the UE is moving slowly or is not moving). The first and second UE mobility threshold may depend on a UE mobility value associated with the UE at the time the use of a current DMTC was initiated. For example, a first mobility value measured at the time the use of the current DMTC was initiated may fall into a range of values for which the current DMTC is appropriate and the first and second mobility thresholds are determined to be the upper and lower bounds of the range.

In configurations that determine whether the UE should transmit a DMTC-adjustment recommendation, if the first UE determines, at 808, that the first UE should transmit a DMTC-adjustment recommendation, the first UE in some configurations may, at 810, determine a recommended DMTC. Determining the recommended DMTC may be based on the UE mobility value or a UE mobility threshold crossed. For example, a first UE mobility value (or crossing a first UE mobility threshold) indicating fast movement of the UE may trigger a DMTC with a shorter periodicity, while, a second UE mobility value (or crossing a second UE mobility threshold) indicating slow movement of the UE may trigger a DMTC with a longer periodicity. For example, 810 may be performed by 1040 in FIG. 10.

After determining, at 810, a recommended DMTC, the first UE may transmit a DMTC recommendation to the second UE at 811. For example, 811 may be performed by 1040 in FIG. 10. Transmitting the determined recommended DMTC may include transmitting (1) a DMTC ID identifying a DMTC in the set of DMTCs received, at 802, by the first UE or (2) a mobility value associated with the first UE. Alternatively, if the first UE has not received a set of DMTCs, the DMTC recommendation may include the UE mobility value or an indication that the UE mobility value is greater than a first UE mobility threshold or is less than a second UE mobility threshold. Additionally, in some configurations that do not determine a recommended DMTC at 810, the DMTC recommendation transmitted at 811 may include the UE mobility value or an indication that the UE mobility value is greater than a first UE mobility threshold or is less than a second UE mobility threshold. The second UE can then use the DMTC recommendation to determine an appropriate DMTC as will be discussed in relation to FIG. 9 below.

If the first UE determines, at 808, that no DMTC-adjustment should be transmitted, FIG. 8 illustrates that the process may continue by receiving, at 812, information from the second UE indicating a DMTC of the set of DMTCs to be used for measuring discovery signals. The DMTC adjustment message may be received through SCI or through a MAC-CE through a PC5 interface. However, one of ordinary skill in the art will understand that the determination made at 808, in some instances will include multiple determinations made periodically or based on certain events (e.g., a detected change in a mobility value) before receiving the information from the second UE indicating a DMTC of the set of DMTCs to be used for measuring discovery signals.

At 812, the first UE may receive information from the second UE indicating a DMTC of the set of DMTCs to be used for measuring discovery signals. For example, 812 may be performed by 1040 in FIG. 10. The DMTC may be indicated by providing the DMTC ID associated with the DMTC. Alternatively, if no set of DMTCs is received at 802, the information indicating the DMTC includes a set of timing information for the second DMTC (e.g., a duration, periodicity, and temporal location of the discovery signals). In addition to the information indicating the DMTC, some configurations may transmit information that includes a carrier, a BWP, a resource pool, a measurement gap, and/or numerology associated with the discovery signals as described in relation to FIGS. 6A-7B. The received information indicating the DMTC to be used for measuring discovery signals, may or may not be in response to a DMTC recommendation transmitted, at 811, by the first UE as will be discussed in relation to FIG. 9 below. After receiving, at 812, the information indicating the DMTC, the first UE measures, at 814, discovery signals based on the indicated DMTC. For example, 814 may be performed by 1040 in FIG. 10.

Figure 9:
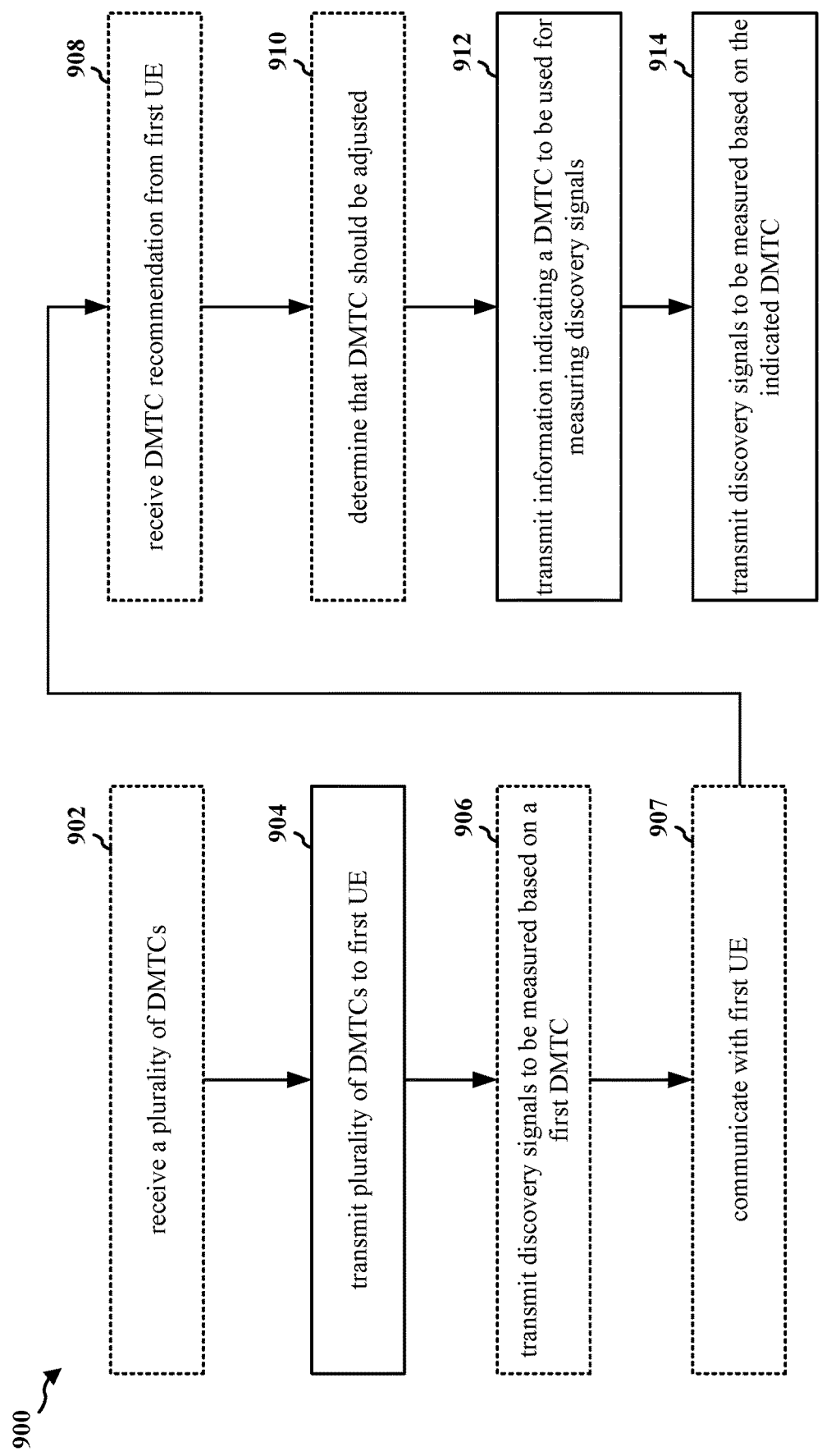
FIG. 9 is a flowchart of a method of wireless communication.

FIG. 9 is a flowchart 900 of a method of wireless communication. The method may be performed by a device at a UE 402/502. The device may be a processor/modem within the UE 402/502 or the UE 402/502 itself. The device is herein referred to as a second UE. Optional aspects are illustrated with a dashed line. In one configuration, the second UE may receive, at 902, a set of one or more DMTCs. For example, 902 may be performed by 1140 in FIG. 11. The set of DMTCs, in some configurations, is a set of pre-configured DMTCs (e.g., pre-configured DMTCs 505) as shown in FIG. 5 that define a set of DMTCs by specifying a DMTC ID that is associated with a duration and periodicity of the discovery signals. In addition to the duration and periodicity of the discovery signals, some configurations may associate information with a DMTC ID that includes a carrier, a BWP, a resource pool, a measurement gap, and/or numerology associated with the DMTC as described in relation to FIGS. 6A-7B. The set of DMTCs may be received from a base station (e.g., base station 503). The DMTCs may be received through RRC signaling (e.g., RRC signal 504B) or system information.

The second UE, at 904, may transmit a set of DMTCs to a first UE (e.g., UE 401/501). For example, 904 may be performed by 1140 in FIG. 11. The transmitted set of DMTCs, in some configurations is the set of DMTCs (e.g., the set of pre-configured DMTCs 505) received from a base station (e.g., base station 503). In other configurations the set of DMTCs is determined by the second UE (e.g., UE 402/502). The set of DMTCs define a set of DMTCs by specifying a DMTC ID that is associated with a duration and periodicity of the discovery signals. In addition to the duration and periodicity of the discovery signals, some configurations may associate information with a DMTC ID that includes a carrier, a BWP, a resource pool, a measurement gap, and/or numerology associated with the DMTC as described in relation to FIGS. 6A-7B. The DMTCs may be received through RRC signaling (e.g., RRC signal 504C) or system information.

In some configurations, the second UE, at 906, may transmit discovery signals to the first UE for the first UE to measure based on a first DMTC. For example, 906 may be performed by 1140 in FIG. 11. In some configurations, the first DMTC is a particular DMTC in the set of DMTCs (e.g., the set of DMTCs 505) that is a default DMTC. In one configuration, the second UE communicates, at 907, with the first UE (e.g., communication 408/508) through at least one of a physical sidelink shared channel (PSSCH) or physical sidelink control channel (PSCCH) through a first carrier (e.g., 610, 710, 730), BWP (e.g., 610, 710, 730), and/or resource pool (e.g., 641 or 642) and using a first numerology (e.g., 0, 1, N) as illustrated by, and discussed in relation to, FIGS. 6A-7B. For example, 907 may be performed by 1140 in FIG. 11. The discovery signals are transmitted through a second carrier (e.g., 610, 710, 740), BWP (e.g., 610, 710, 740), and/or resource pool (e.g., 641 or 642) and using a second numerology (e.g., 0, 1, N) as in FIGS. 7A and 7B. The second carrier, BWP, resource pool and/or numerology can be the same as, or different from, the first carrier, BWP, resource pool and/or numerology as illustrated by, and discussed in relation to, FIGS. 6A-7B.

In some configurations, the second UE may receive, at 908, a DMTC recommendation (e.g., DMTC recommendation 409/509A/509C) from the first UE (e.g., receives the DMTC recommendation transmitted by the first UE at 811) or from a base station that communicates a recommendation from the first UE to the second UE (e.g., DMTC recommendations 509B communicated to a base station and 509C communicated to UE 502). For example, 908 may be performed by 1140 in FIG. 11. The received DMTC recommendation, in some configurations, is a DMTC ID identifying a DMTC in the set of DMTCs received, at 902, by the second UE. Alternatively, the DMTC recommendation may include the UE mobility value or an indication that the UE mobility value is greater than a second UE mobility threshold or is less than a first UE mobility threshold.

At 910, the second UE may determine that the DMTC should be adjusted. If a DMTC recommendation was received at 908, the determination may be based on the received DMTC recommendation. For example, 910 may be performed by 1140 in FIG. 11. For example, if the received DMTC recommendation includes information regarding a UE mobility that suggest that an adjustment to a current DMTC (the UE mobility is higher or lower than a threshold UE mobility associated with a current DMTC) may be beneficial (e.g., more efficient, more reliable, etc.), a determination to adjust the DMTC is made. Additionally, the second UE may determine that the DMTC should be adjusted based on measurements of reference signals transmitted by the first UE failing to meet a strength, quality, and/or timing specification (e.g., expressed as a threshold value). The second UE may further determine that the DMTC should be adjusted based on determining that one or more measured characteristics of sets of reference signals received at different times is changing faster than a first threshold rate (such that the periodicity of the discovery signals should be decreased) or more slowly than a second threshold rate (such that the periodicity of the discovery signals should be increased).

At 912, the second UE may transmit information to the first UE indicating that measurements of discovery signals should be based on a particular DMTC (e.g., the DMTC determined at 910). For example, 912 may be performed by 1140 in FIG. 11. The DMTC adjustment message may be transmitted through a MAC-CE, SCI, or PSFCH. If a set of DMTCs is transmitted at 904, the particular DMTC may be indicated by providing the DMTC ID associated with the particular DMTC. Alternatively, if no set of DMTCs is received at 902, the information indicating the particular DMTC includes a set of timing information for the particular DMTC (e.g., a duration, periodicity, and temporal location of the discovery signals). Additionally, the information indicating a DMTC, in some configurations may include a carrier, a BWP, a resource pool, a measurement gap, and/or numerology associated with the discovery signals as described in relation to FIGS. 6A-7B. After transmitting, at 912, the information indicating the particular DMTC, the second UE transmits, at 914, discovery signals for the UE to measure based on the indicated DMTC (e.g., as in communication 516 of FIG. 5). For example, 914 may be performed by 1140 in FIG. 11.

Figure 10:
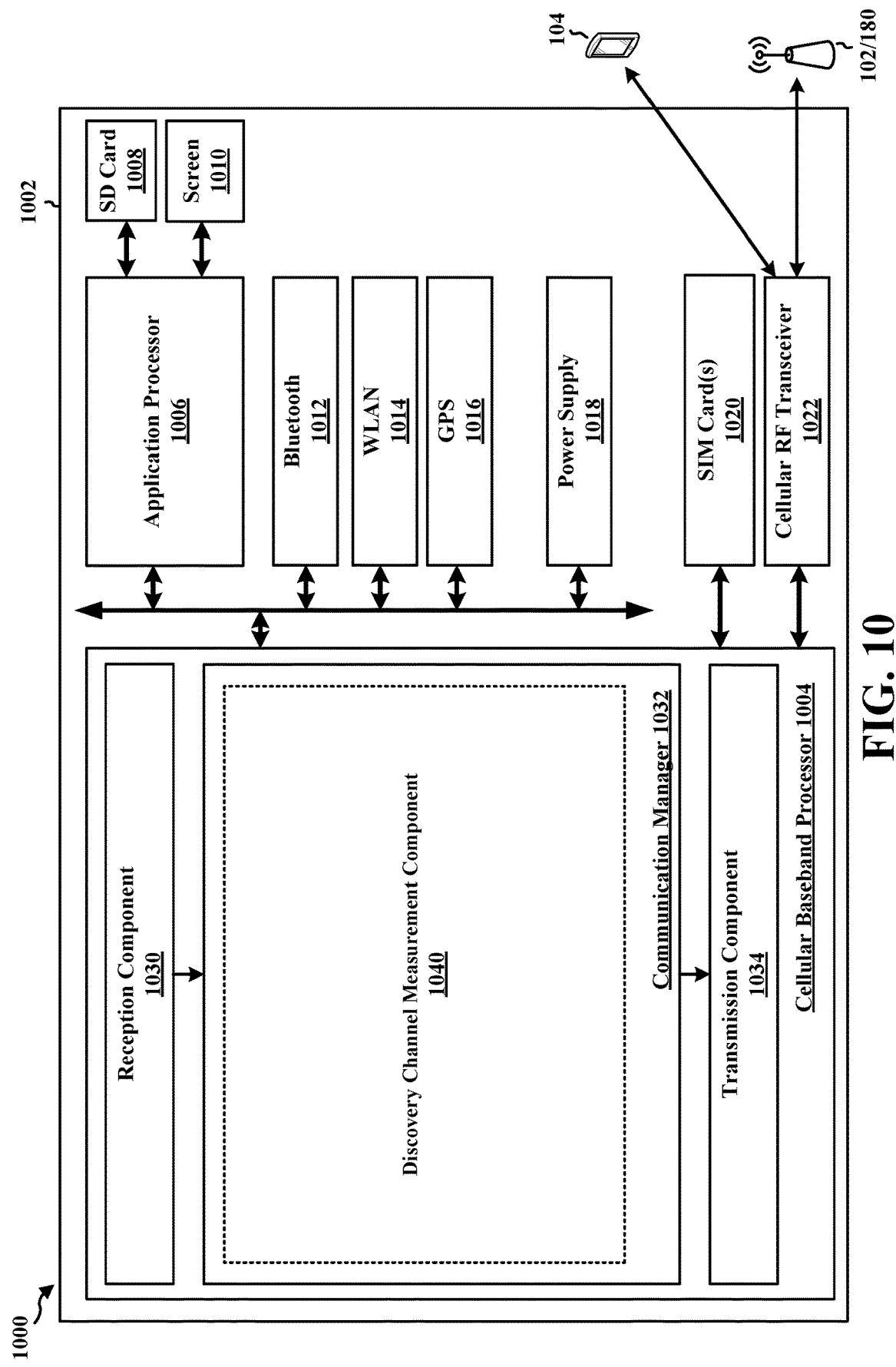
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes a discovery channel measurement component 1040 that is configured to allow the UE to adaptively measure discovery signals associated with a discovery channel using different DMTCs based on different (e.g., changing) conditions, e.g., as described in connection with operations 802-814 of FIG. 8. Adaptive DMTC component 1040 may be configured to receive, from a second UE, a set of DMTCs, as described in connection with 802 in FIG. 8. Adaptive DMTC component 1040 may also be configured to receive information indicating a DMTC of the set of DMTCs to be used for measuring discovery signals, as described in connection with 810 in FIG. 8. Adaptive DMTC component 1040 may also be configured to measure discovery signals received from the second UE based on the indicated DMTC configuration, as described in connection with 812 in FIG. 8. The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving, from a second apparatus, a set of DMTCs. The apparatus 1002, and in particular the cellular baseband processor 1004, further includes means for receiving information indicating that discovery signals should be measured based on a DMTC of the set of DMTCs. The apparatus 1002, and in particular the cellular baseband processor 1004, further includes means for measuring discovery signals received from the second UE based on the indicated DMTC. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
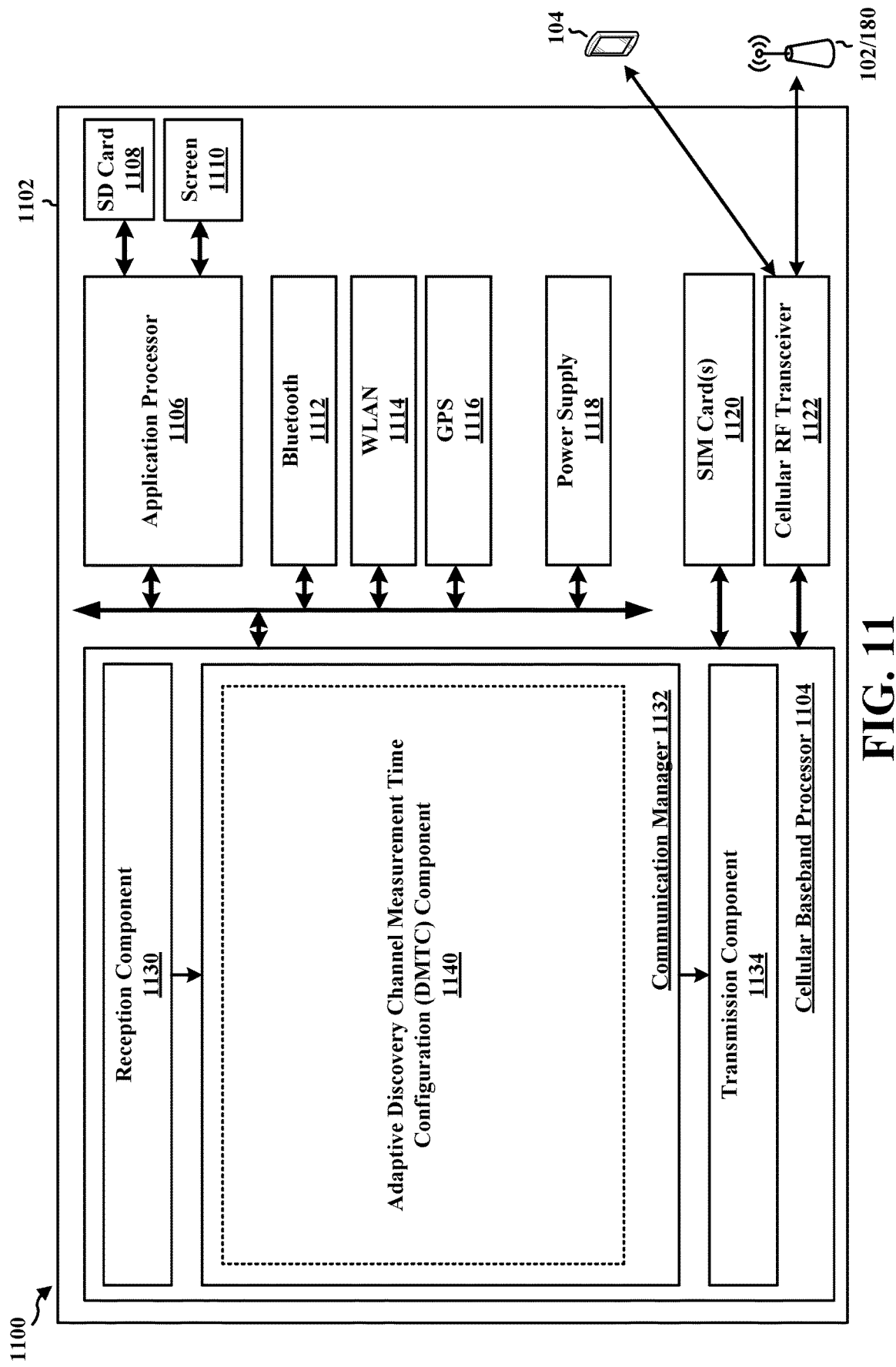
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes an adaptive DMTC component 1140 that allows the UE to adaptively indicate different DMTCs for a connected UE (e.g., UE 1002) based on different (e.g., changing) conditions, e.g., as described in connection with operations 902-914 of FIG. 9. Adaptive DMTC component 1140 may be configured to transmit, to a first UE, a set of DMTCs as described in connection with 904 in FIG. 9. Adaptive DMTC component 1140 may also be configured to transmit, to the first UE, information indicating a DMTC of the set of DMTCs to be used by the first UE for measuring discovery signals as described in connection with 912 in FIG. 9. Adaptive DMTC component 1140 may also be configured to transmit discovery signals to the first UE for the first UE to measure based on the indicated DMTC as described in connection with 914 in FIG. 9. One of ordinary skill in the art will appreciate that, in addition to discovery signals measured by a particular other apparatus (e.g., 1002) based on a particular DMTC, apparatus 1102 may transmit additional discovery signals outside the time and/or frequency resources associated with the particular DMTC. The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The apparatus 1102, and in particular the cellular baseband processor 1104, further includes means for transmitting, to a first UE, a set of DMTCs. The apparatus 1102, and in particular the cellular baseband processor 1104, further includes means for transmitting, to the first UE, information indicating a DMTC of the set of DMTCs to be used by first UE for measuring discovery signals. The apparatus 1102, and in particular the cellular baseband processor 1104, further includes means for transmitting discovery signals to the first UE for the first UE to measure based on the indicated DMTC. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Referring again to FIGS. 4-9, a method and apparatus in association with adaptive DMTC for SL communications is provided. The adaptive DMTC allows the SL communication to use an appropriate amount of resources in a time-and-frequency resource space depending on changing conditions. For a first UE that establishes a PC5 interface with a second UE that relays communications from the first UE to a base station a first DMTC may be appropriate at a first time and at a second time a second DMTC may be appropriate. For example, if the first and second UEs are stationary relative to each other, a first DMTC with a first period between discovery signals may be appropriate, but if one of the UEs begins moving relative to the other a second, shorter, period associated with a second DMTC may be appropriate. Additionally, if each UE is configured with a plurality of (pre-configured) DMTCs signaling a switch from one DMTC in the set of DMTCs to another DMTC in the set of DMTCs is simplified by transmitting an identifier of the other DMTC instead of transmitting all the information necessary to define a DMTC.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a first UE, including receiving, from a second UE, a set of DMTCs, receiving information indicating a DMTC of the set of DMTCs to be used for measuring discovery signals, and measuring discovery signals received from the second UE based on the indicated DMTC.

Aspect 2 is the method of aspect 1, where the set of DMTCs is received through RRC signaling or system information.

Aspect 3 is the method of any of aspects 1 and 2, where the information indicating the DMTC of the set of DMTCs to be used for measuring discovery signals is received through at least one of a MAC-CE, SCI, or PSFCH.

Aspect 4 is the method of any of aspects 1 to 3, where one of the DMTCs in the set of DMTCs is a default DMTC for measuring discovery signals when the information indicating the DMTC of the set of DMTCs is not received.

Aspect 5 is the method of any of aspects 1 to 4, where the DMTC includes at least a duration and a periodicity for measuring discovery signals.

Aspect 6 is the method of any of aspects 1 to 5, further including receiving second information indicating that a first resource pool should be used for performing channel measurements on the discovery signals received from the second UE based on the indicated DMTC, wherein the channel measurements are performed based on the indicated DMTC within the resources of the first resource pool and communicating through at least one of a physical sidelink shared channel (PSSCH) or physical sidelink control channel (PSCCH) with the second UE through a second resource pool.

Aspect 7 is the method of any of aspects 1 to 5, further including receiving second information indicating that a first carrier should be used for performing channel measurements on the discovery signals received from the second UE based on the indicated DMTC, wherein the channel measurements are performed based on the indicated DMTC within the first carrier and communicating through at least one of a physical sidelink shared channel (PSSCH) or physical sidelink control channel (PSCCH) with the second UE through a second carrier.

Aspect 8 is the method of any of aspects 1 to 5, further including communicating through at least one of a physical sidelink shared channel (PSSCH) or physical sidelink control channel (PSCCH) with the second UE on an active bandwidth part (BWP), where the channel measurements performed on the discovery signals received from the second UE based on the indicated DMTC are performed outside the BWP and refraining from transmitting or receiving data communication with the second UE when performing the channel measurements on the discovery signals received from the second UE.

Aspect 9 is the method of any of aspects 1 to 5, further including communicating through at least one of a physical sidelink shared channel (PSSCH) or physical sidelink control channel (PSCCH) with the second UE using a first numerology, wherein the channel measurements performed on the discovery signals received from the second UE based on the indicated DMTC use a second, different numerology and refraining, due to the different first and second numerologies, from transmitting or receiving communication with the second UE when performing the channel measurements on the discovery signals received from the second UE.

Aspect 10 is the method of any of aspects 1 to 9, further including communicating through at least one of a physical sidelink shared channel (PSSCH) or physical sidelink control channel (PSCCH) with the second UE using a first numerology, wherein the channel measurements performed on the discovery signals received from the second UE based on the indicated DMTC use a second, different numerology and refraining, due to the different first and second numerologies, from transmitting or receiving communication with the second UE when performing the channel measurements on the discovery signals received from the second UE.

Aspect 11 is the method of 10, further including determining whether UE mobility conditions are greater than a first UE mobility threshold or less than a second UE mobility threshold, wherein the DMTC recommendation is transmitted based on the determination.

Aspect 12 is a method of wireless communication of a second UE, including transmitting, to a first UE, a set of DMTCs, transmitting, to the first UE, information indicating a DMTC of the set of DMTCs to be used by the first UE for measuring discovery signals and transmitting discovery signals to the first UE for the first UE to measure based on the indicated DMTC.

Aspect 13 is the method of aspect 12, where the set of DMTCs is transmitted through radio resource control (RRC) signaling or system information.

Aspect 14 is the method of any of aspects 12 and 13, further including transmitting second information indicating at least one of a first resource pool, a first carrier, a first bandwidth part (BWP), or a first numerology through which the discovery signals are transmitted from the second UE for the first UE to measure based on the indicated DMTC and communicating through at least one of a physical sidelink shared channel (PSSCH) or physical sidelink control channel (PSCCH) with the first UE through at least one of a corresponding second resource pool, second carrier, second BWP, or second numerology.

Aspect 15 is the method of any of aspects 12 to 14, further including receiving a DMTC recommendation associated with the indicated DMTC from the first UE, wherein the information indicating the DMTC of the set of DMTCs to be used for measuring discovery signals is transmitted in response to the received DMTC recommendation through one of a media access control (MAC) control element (CE) (MAC-CE) or sidelink control information (SCI).

Aspect 16 is an apparatus for wireless communication including at least one processor coupled to a memory and configured to implement a method as in any of aspects 1 to 15.

Aspect 17 is an apparatus for wireless communication including means for implementing a method as in any of aspects 1 to 15.

Aspect 18 is a computer-readable medium storing computer executable code, where the code when executed by a processor causes the processor to implement a method as in any of aspects 1 to 15.

What is claimed is:

1. A method of wireless communication of a first user equipment (UE), comprising:
   receiving, from a second UE, a set of discovery channel measurement time configurations (DMTCs);
   receiving information indicating a DMTC of the set of DMTCs to be used for measuring discovery signals; and
   measuring discovery signals received from the second UE based on the indicated DMTC.

2. The method of claim 1, wherein the set of DMTCs is received through radio resource control (RRC) signaling or system information.

3. The method of claim 1, wherein the information indicating the DMTC of the set of DMTCs to be used for measuring discovery signals is received through one of a media access control (MAC) control element (CE) (MAC-CE) or sidelink control information (SCI).

4. The method of claim 1, wherein one of the DMTCs in the set of DMTCs is a default DMTC that is used for measuring discovery signals when the information indicating the DMTC of the set of DMTCs is not received.

5. The method of claim 1, wherein the DMTC includes at least a duration and a periodicity for measuring discovery signals.

6. The method of claim 1, further comprising:
   receiving second information indicating that a first resource pool should be used for performing channel measurements on the discovery signals received from the second UE based on the indicated DMTC, wherein the channel measurements are performed based on the indicated DMTC within the resources of the first resource pool; and
   communicating through at least one of a physical sidelink shared channel (PSSCH) or physical sidelink control channel (PSCCH) with the second UE through a second resource pool.

7. The method of claim 1, further comprising:
   receiving second information indicating that a first carrier should be used for performing channel measurements on the discovery signals received from the second UE based on the indicated DMTC, wherein the channel measurements are performed based on the indicated DMTC within the first carrier; and
   communicating through at least one of a physical sidelink shared channel (PSSCH) or physical sidelink control channel (PSCCH) with the second UE through a second carrier.

8. The method of claim 1, further comprising:
   communicating through at least one of a physical sidelink shared channel (PSSCH) or physical sidelink control channel (PSCCH) with the second UE on an active bandwidth part (BWP), wherein the channel measurements performed on the discovery signals received from the second UE based on the indicated DMTC are performed outside the BWP; and
   refraining from transmitting or receiving data communication with the second UE when performing the channel measurements on the discovery signals received from the second UE.

9. The method of claim 1, further comprising:
   communicating through at least one of a physical sidelink shared channel (PSSCH) or physical sidelink control channel (PSCCH) with the second UE using a first numerology, wherein the channel measurements performed on the discovery signals received from the second UE based on the indicated DMTC use a second, different numerology; and refraining, due to the different first and second numerologies, from transmitting or receiving communication with the second UE when performing the channel measurements on the discovery signals received from the second UE.

10. The method of claim 1, further comprising transmitting a DMTC recommendation associated with the indicated DMTC to the second UE, wherein the DMTC recommendation associated with the indicated DMTC comprises at least one of UE mobility conditions at the first UE or a recommendation to switch from a current DMTC to the indicated DMTC.

11. The method of claim 10, further comprising determining whether UE mobility conditions are greater than a first UE mobility threshold or less than a second UE mobility threshold, wherein the DMTC recommendation is transmitted based on the determination.

12. An apparatus for wireless communication, the apparatus being a first user equipment (UE) comprising:
a memory; and
at least one processor coupled to the memory and configured to:
receive, from a second UE, a set of discovery channel measurement time configurations (DMTCs);
receive information indicating a DMTC of the set of DMTCs to be used for measuring discovery signals; and
measure discovery signals received from the second UE based on the indicated DMTC.

13. The apparatus of claim 12, wherein the set of DMTCs is received through radio resource control (RRC) signaling or system information.

14. The apparatus of claim 12, wherein the information indicating the DMTC of the set of DMTCs to be used for measuring discovery signals is received through one of a media access control (MAC) control element (CE) (MAC-CE) or sidelink control information (SCI).

15. The apparatus of claim 12, wherein one of the DMTCs in the set of DMTCs is a default DMTC that is used for measuring discovery signals when the information indicating the DMTC of the set of DMTCs is not received.

16. The apparatus of claim 12, wherein the DMTC includes at least a duration and a periodicity for measuring discovery signals.

17. The apparatus of claim 12, wherein the at least one processor is further configured to:
receive second information indicating that a first resource pool should be used for performing channel measurements on the discovery signals received from the second UE based on the indicated DMTC, wherein the channel measurements are performed based on the indicated DMTC within the resources of the first resource pool; and
communicate through at least one of a physical sidelink shared channel (PSSCH) or physical sidelink control channel (PSCCH) with the second UE through a second resource pool.

18. The apparatus of claim 12, wherein the at least one processor is further configured to:
receive second information indicating that a first carrier should be used for performing channel measurements on the discovery signals received from the second UE based on the indicated DMTC, wherein the channel measurements are performed based on the indicated DMTC within the first carrier; and
communicate through at least one of a physical sidelink shared channel (PSSCH) or physical sidelink control channel (PSCCH) with the second UE through a second carrier.

19. The apparatus of claim 12, wherein the at least one processor is further configured to:
communicate through at least one of a physical sidelink shared channel (PSSCH) or physical sidelink control channel (PSCCH) with the second UE on an active bandwidth part (BWP), wherein the channel measurements performed on the discovery signals received from the second UE based on the indicated DMTC are performed outside the active BWP; and
refrain from transmitting or receiving data communication with the second UE when performing the channel measurements on the discovery signals received from the second UE.

20. The apparatus of claim 12, wherein the at least one processor is further configured to:
communicate through at least one of a physical sidelink shared channel (PSSCH) or physical sidelink control channel (PSCCH) with the second UE using a first numerology, wherein the channel measurements performed on the discovery signals received from the second UE based on the indicated DMTC use a second, different numerology; and
refrain, due to the different first and second numerologies, from transmitting or receiving data communication with the second UE when performing the channel measurements on the discovery signals received from the second UE.

21. The apparatus of claim 12, wherein the at least one processor is further configured to transmit a DMTC recommendation associated with the indicated DMTC to the second UE, wherein the DMTC recommendation associated with the indicated DMTC comprises at least one of UE mobility conditions at the first UE or a recommendation to switch from a current DMTC to the indicated DMTC.

22. The apparatus of claim 21, wherein the at least one processor is further configured to determine whether UE mobility conditions are greater than a first UE mobility threshold or less than a second UE mobility threshold, wherein the DMTC recommendation is transmitted based on the determination.

23. A method of wireless communication of a second user equipment (UE), comprising:
transmitting, to a first UE, a set of discovery channel measurement time configurations (DMTCs);
transmitting, to the first UE, information indicating a DMTC of the set of DMTCs to be used by the first UE for measuring discovery signals; and
transmitting discovery signals to the first UE for the first UE to measure based on the indicated DMTC.

24. The method of claim 23, wherein the set of DMTCs is transmitted through radio resource control (RRC) signaling or system information.

25. The method of claim 23, further comprising:
transmitting second information indicating at least one of a first resource pool, a first carrier, a first bandwidth part (BWP), or a first numerology through which the discovery signals are transmitted from the second UE for the first UE to measure based on the indicated DMTC; and communicating through at least one of a physical sidelink shared channel (PSSCH) or physical sidelink control channel (PSCCH) with the first UE through at least one of a corresponding second resource pool, second carrier, second BWP, or second numerology.

26. The method of claim 23, further comprising receiving a DMTC recommendation associated with the indicated DMTC from the first UE, wherein the information indicating the DMTC of the set of DMTCs to be used for measuring discovery signals is transmitted in response to the received DMTC recommendation through one of a media access control (MAC) control element (CE) (MAC-CE) or sidelink control information (SCI).

27. An apparatus for wireless communication, the apparatus being a second user equipment (UE) comprising:
  a memory; and
  at least one processor coupled to the memory and configured to:
    transmit, to a first UE, a set of discovery channel measurement time configurations (DMTCs);
    transmit, to the first UE, information indicating a DMTC of the set of DMTCs to be used by the first UE for measuring discovery signals; and
    transmit discovery signals to the first UE for the first UE to measure based on the indicated DMTC.

28. The apparatus of claim 27, wherein the set of DMTCs is transmitted through radio resource control (RRC) signaling or system information.

29. The apparatus of claim 27, wherein the at least one processor is further configured to:
  transmit second information indicating at least one of a first resource pool, a first carrier, a first bandwidth part (BWP), or a first numerology through which the discovery signals are transmitted from the second UE for the first UE to measure based on the indicated DMTC; and
  communicate through at least one of a physical sidelink shared channel (PSSCH) or physical sidelink control channel (PSCCH) with the first UE through at least one of a corresponding second resource pool, second carrier, BWP, or second numerology.

30. The apparatus of claim 27, wherein the at least one processor is further configured to receive a DMTC recommendation associated with the indicated DMTC from the first UE, wherein the information indicating the DMTC of the set of DMTCs to be used for measuring discovery signals is transmitted in response to the received DMTC recommendation through one of a media access control (MAC) control element (CE) (MAC-CE) or sidelink control information (SCI).

* * * * *